Patented Apr. 23, 1946

2,399,019

UNITED STATES PATENT OFFICE 2,399,019

METHOD OF ADHERING RUBBER TO METALS

Hershel W. Grinter, Cuyahoga Falls, and Malcolm E. Gross, Akron, Ohio, assignors to The B. F. Goodrich Company, New York, N. Y., a corporation of New York No Drawing. Application February 25, 1942, Serial No. 432,260

11 Claims. (Cl. 154—130)

This invention relates to a method for adhering rubber to certain metal surfaces, and to the product prepared thereby.

In the manufacture of composite rubber-metal products the chief difficulty with which the manufacturer must contend is the proper adhesion of the rubber to the metal. Although many different methods have been proposed for obtaining good adhesion many of these methods leave something lacking, either in results obtained or in convenience of procedure. It is the object of this invention to provide a method of adhering rubber to certain metals which is not only inexpensive and simple to use but which also produces a strongly adhesive bond between the rubber and any of this certain group of metals.

We have discovered that rubber can be adhered to certain metals by first exposing any of these metals to a chemical compound capable of forming a metal sulfide on the surface thereof and then applying a vulcanizable rubber composition over the exposed surface and vulcanizing the rubber under pressure. The metals with which this method may be used are all those metals which form dark colored sulfides, either black, brown, dark green, or some similar dark color as contrasted to those metals forming light colored sulfides of such colors as white, yellow, pink, or the like. These metals include some of the more commonly used metals such as chromium, cobalt, copper, gold, iron, lead, nickel, and silver as well as those not ordinarily used to make rubber-metal composite structures. These latter include bismuth, iridium, molybdenum, osmium, palladium, platinum, ruthenium, thallium, and vanadium. By the method of this invention a composite product may be obtained in which the rubber is very firmly adhered to the metal in a tenacious, and permanent bond.

In practicing our invention we treat the metal chosen from the above list with any chemical adapted to convert the surface of the metal into a sulfide. Hydrogen sulfide is preferred as this is easy to use and there are no bothersome by-products of the sulfiding reaction to remove. It should be understood, however, that other chemicals also adapted to form the metal sulfide may be used, if desired, as the purpose of such sulfiding treatment is, of course, to form a sulfide of the metal on the surface of the metal. After treatment of the metal surface with the chemical, the treated surface is covered with a vulcanizable rubber composition and the rubber is vulcanized under pressure. When vulcanization is complete the rubber will be found to be strongly adhered to the metal.

Two specific examples of this invention will serve to illustrate the method used. In the first example an iron panel was blasted with grit to remove scale and washed with benzol to remove dirt and grease. The panel was then exposed to hydrogen sulfide gas for one minute, removed from the gas, a vulcanizable rubber composition was applied to the treated metal surface, and the rubber was vulcanized under pressure. When vulcanization was complete the rubber was found to be firmly and tenaciously adhered to the metal.

In the second example a nickel plated panel was washed with benzol to remove any grease and was then immersed in a substantially saturated water solution of hydrogen sulfide. After thirty seconds the panel was withdrawn, washed with water, then with acetone, and dried. In as short a time as possible a vulcanizable rubber composition was placed over one surface of the treated panel and the rubber was vulcanized under pressure. As in the first example, above, the rubber was found to be firmly adhered to the metal surface.

Tests have shown that the ability of the metallic sulfide to form a strongly tenacious bond with rubber is either completely lost or considerably impaired after about 90 minutes of exposure to the air. To correct this the metallic sulfide surface may be covered with a binder such as rubber, rubber cement, latex compositions such as latex-hemoglobin, asphalt, various resins, waxes, oils, or the like that will not only exclude air but that will also be assimilable by the rubber that is to be adhered. Where the metallic sulfide surface is prepared by treating the metal surface with a solution, such as a water solution, of a chemical adapted to convert the metal into a sulfide this loss of ability to promote adhesion may be prevented by adding to the solution an oxidation inhibitor such as quinoline, pyridine, a naphthol amine or other aromatic amine, or any of the other usual and well-known inhibitors of oxidation.

As indicated herein, when the preferred hydrogen sulfide is used to form the metal sulfide this reagent may be applied to the metal surface either in its ordinary gaseous form or in the form of a solution, preferably a substantially saturated water solution. Other solvents may be used to make up the treating solution and these include methyl alcohol, ethyl alcohol, carbon disulfide, as well as other common and well-known solvents. When using gaseous hydrogen sulfide the metal is merely exposed to the gas for the length of time desired, preferably for not longer than fifteen minutes, and when a water solution is used the solution is applied to the metal and after the desired time, again not longer than fifteen minutes, the solution is washed off with ordinary distilled water and the metal is dried. Thereafter a vulcanizable rubber composition is applied to the treated metal surface and the rubber is vulcanized under pressure.

The term "rubber" used throughout the specification and claims is intended to include not only natural rubber but also the vulcanizable synthetic elastics known commonly as synthetic rubbers. These include the polymers of butadiene and the copolymers of butadiene and other materials that are copolymerizable therewith, such materials being well known in the rubber art.

This application is related to our copending application, Serial No. 432,259, filed concurrently herewith on February 25, 1942.

Having disclosed our invention together with preferred examples of methods of practicing it, it is our desire to protect the invention broadly within the spirit and scope of the appended claims.

We claim:

1. The method of adhering rubber to the surface of a metal which has the property of forming a dark-colored metal sulfide, said method comprising producing the dark-colored sulfide of said metal on said surface by treating said surface with a sulfiding agent capable of reacting directly with the metal in the absence of high temperatures, removing the sulfiding agent, after removal of the sulfiding agent but before any substantial oxidation of the metal sulfide has occurred associating with the said sulfided surface a vulcanizable rubber composition and vulcanizing the rubber while the assembly is under pressure.

2. The method of adhering rubber to the surface of a metal which has the property of forming a dark-colored metal sulfide, said method comprising producing the dark-colored sulfide of said metal on said surface by treating said surface with hydrogen sulfide in the absence of high temperatures, removing the hydrogen sulfide, after such removal of the hydrogen sulfide but before any substantial oxidation of the metal sulfide has occurred associating with the said sulfided surface a vulcanizable rubber composition and vulcanizing the rubber while the assembly is under pressure.

3. The method of adhering rubber to the surface of a metal which has the property of forming a dark-colored metal sulfide, said method comprising producing the dark-colored sulfide of said metal on said surface by treating said surface with hydrogen sulfide in gaseous form and in the absence of high temperatures, removing the metal from the hydrogen sulfide, after such removal but before any substantial oxidation of the metal sulfide has occurred associating with the said surface a vulcanizable rubber composition and vulcanizing the rubber while the assembly is under pressure.

4. The method of adhering rubber to the surface of a metal which has the property of forming a dark-colored metal sulfide, said method comprising producing the dark-colored sulfide of said metal on said surface by treating said surface with a liquid solution of hydrogen sulfide, removing the treating solution from the metal, after such removal but before any substantial oxidation of the metal sulfide has occurred associating with the said surface a vulcanizable rubber composition and vulcanizing the rubber while the assembly is under pressure.

5. The method of adhering rubber to the surface of a metal which has the property of forming a dark-colored metal sulfide, said method comprising producing the dark-colored sulfide of said metal on said surface by treating said surface with a water solution of hydrogen sulfide, removing the treating solution from the metal, after such removal but before any substantial oxidation of the metal sulfide has occurred associating with the said surface a vulcanizable rubber composition and vulcanizing the rubber while the assembly is under pressure.

6. The method of adhering rubber to the surface of a metal which has the property of forming a dark-colored metal sulfide, said method comprising producing the dark-colored sulfide of said metal on said surface by treating said surface with a substantially saturated water solution of hydrogen sulfide in the absence of high temperatures, removing the solution from the metal, after such removal but before any substantial oxidation of the metal sulfide has occurred associating with the said surface a vulcanizable rubber composition and vulcanizing the rubber while the assembly is under pressure.

7. The method of adhering rubber to the surface of a metal which has the property of forming a dark-colored sulfide, said method comprising producing the dark-colored sulfide of said metal on said surface by treating said surface with a solution containing a sulfiding agent capable of reacting directly with the metal in the absence of high temperatures and also containing an inhibitor of oxidation, removing the solution from the metal, after such removal but before any substantial oxidation of the metal sulfide has occurred associating with the said surface a vulcanizable rubber composition and vulcanizing the rubber while the assembly is under pressure.

8. The method of adhering rubber to the surface of a metal which has the property of forming a dark-colored metal sulfide, said method comprising producing the dark-colored sulfide of said metal on said surface by treating said surface at ordinary room temperatures with a sulfiding agent capable of reacting directly with the metal at such temperatures, removing the sulfiding agent, after such removal of the sulfiding agent but before any substantial oxidation of the metal sulfide has occurred associating with the said surface a vulcanizable rubber composition and vulcanizing the rubber while the assembly is under pressure.

9. The method of adhering rubber to the surface of a metal which has the property of forming a dark-colored metal sulfide, said method comprising producing the dark-colored sulfide of said metal on said surface by treating said surface at ordinary room temperatures with hydrogen sulfide, removing the hydrogen sulfide from the metal, after such removal but before any substantial oxidation of the metal sulfide has occurred associating with the said surface a vulcanizable rubber composition and vulcanizing the rubber while the assembly is under pressure.

10. A composite product comprising metal which has the property of forming a dark-colored metal sulfide and vulcanized rubber in adhering relation therewith, said product having been produced in accordance with the method of claim 1.

11. A composite product comprising metal which has the property of forming a dark-colored metal sulfide and vulcanized rubber in adhering relation therewith, said product having been produced in accordance with the method of claim 2.

HERSHEL W. GRINTER.
MALCOLM E. GROSS.